United States Patent [19]

Skarvada

[11] Patent Number: 4,720,794

[45] Date of Patent: Jan. 19, 1988

[54] APPARATUS FOR GENERATING A REFERENCE SIGNAL IN A BRAKE CONTROL SYSTEM

[75] Inventor: Thomas Skarvada, Granada Hills, Calif.

[73] Assignee: Crane Co., Chicago, Ill.

[21] Appl. No.: 394,130

[22] Filed: Jul. 1, 1982

Related U.S. Application Data

[63] Continuation-in-part of Ser. No. 363,476, Mar. 30, 1982, abandoned, which is a continuation of Ser. No. 060,573, Jul. 25, 1979, Pat. No. 4,323,969.

[51] Int. Cl.$^4$ .......................... G06F 15/20; B60T 8/08
[52] U.S. Cl. ...................................... 364/426; 303/95; 303/109
[58] Field of Search .................. 364/425, 426; 303/20, 303/93–95, 100, 106, 109

[56] References Cited

U.S. PATENT DOCUMENTS

| Re. 31,383 | 9/1983 | Leiber et al. | 364/426 |
|---|---|---|---|
| 3,724,916 | 4/1973 | Hirzel | 303/21 BE |
| 3,729,234 | 4/1973 | Hirzel | 303/109 X |
| 3,737,201 | 6/1973 | Okamoto et al. | 303/109 X |
| 3,776,357 | 12/1973 | Arai et al. | 303/109 X |
| 3,804,470 | 4/1974 | Slavin et al. | 303/109 X |
| 3,840,816 | 10/1974 | Fleagle | 328/115 |
| 3,842,355 | 10/1974 | Fleagle | 328/114 |
| 3,915,508 | 10/1975 | Grosseau | 303/109 X |
| 3,976,860 | 8/1976 | Gerstenmeier et al. | 364/426 X |
| 3,988,599 | 10/1976 | Fleagle | 307/265 |
| 4,056,287 | 11/1977 | Gudat | 303/91 |
| 4,066,230 | 1/1978 | Nohmi et al. | 364/426 X |
| 4,068,903 | 1/1978 | Straub | 303/99 |
| 4,070,562 | 1/1978 | Kuno et al. | 364/426 |
| 4,089,564 | 5/1978 | Öberg | 303/109 |
| 4,125,295 | 11/1978 | Ruhnau et al. | 303/95 |
| 4,184,203 | 1/1980 | Skarvada | 364/426 |
| 4,320,459 | 3/1982 | Lindemann et al. | 364/426 |
| 4,338,670 | 7/1982 | Skarvada | 364/426 |

Primary Examiner—Gary V. Harkcom
Attorney, Agent, or Firm—Willian Brinks Olds Hofer Gilson & Lione Ltd.

[57] ABSTRACT

An apparatus for generating a reference signal in a brake control system stores a reference signal representative of a reference braking condition and compares this reference signal with a conditioned wheel signal. Depending on the outcome of the comparison, the reference signal is either updated to correspond to a reduced reference braking condition or ramped to correspond to an increased braking condition. The reference signal is not simultaneously ramped and updated, and is, therefore, precisely controlled. In a first embodiment, the amount by which the reference signal is ramped is a function of the past history of the reference signal: each time the reference signal is ramped the ramp rate is increased and each time the reference signal is updated the ramp rate is decreased. The apparatus of this embodiment generates the conditioned wheel signal from the wheel signal by averaging the maximum and minimum wheel signals in a preselected group and by then reducing this average by an amount proportional to the difference between the maximum and minimum wheel signals. In this way undesirable oscillations, such as those due to pitching of the wheel truck, are filtered out. In a second embodiment the conditioned wheel signal is set equal to the minimum wheel signal in a preselected group, and the reference signal is set equal to the conditioned wheel signal in the event the reference signal is less than the conditioned wheel signal.

31 Claims, 5 Drawing Figures

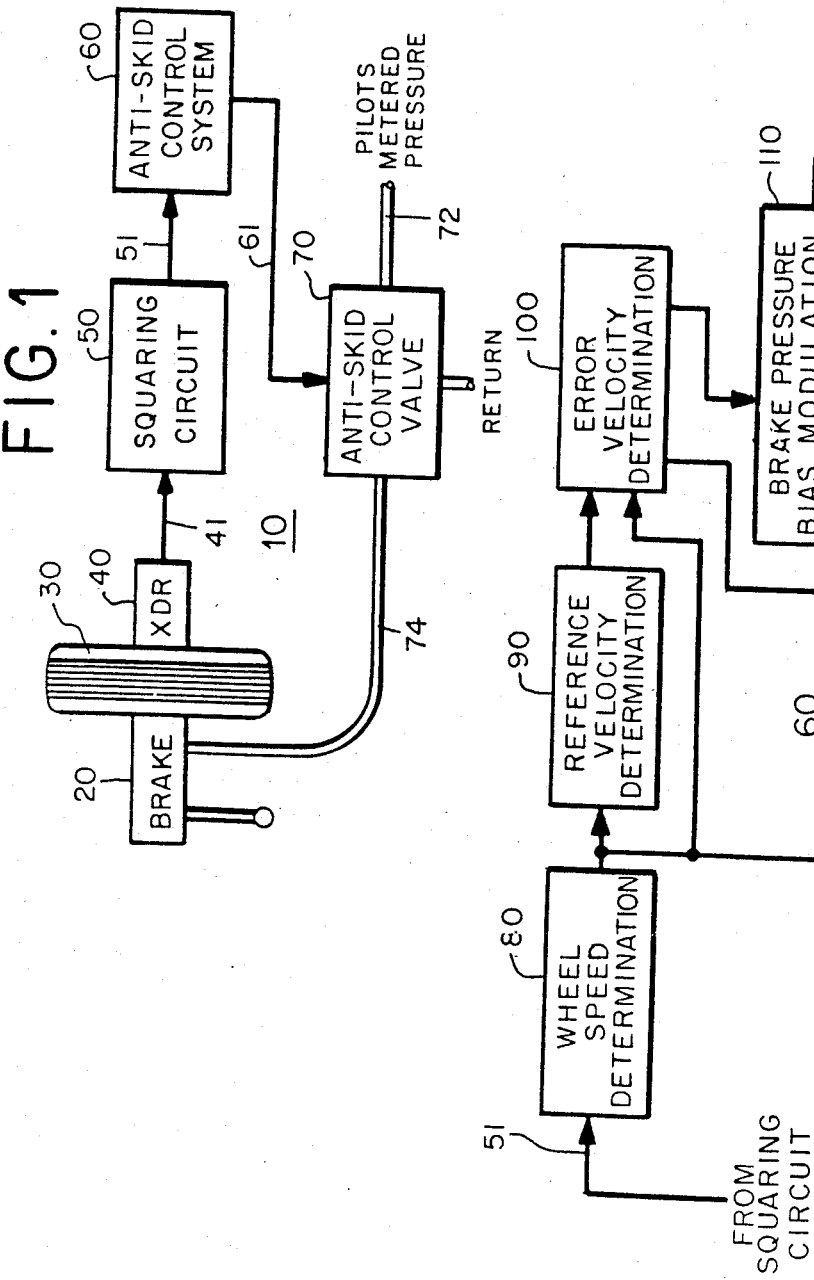

APPARATUS FOR GENERATING A REFERENCE SIGNAL IN A BRAKE CONTROL SYSTEM

IDENTIFICATION OF RELATED APPLICATIONS

This application is a continuation-in-part of co-pending application Ser. No. 363,476, filed Mar. 30, 1982, now abandoned, which is in turn a continuation of application Ser. No. 060,573, filed July 25, 1979, now U.S. Pat. No. 4,323,969.

BACKGROUND OF THE INVENTION

The present invention is directed to an improved apparatus for generating a reference signal representative of a reference braking condition in a brake control system. The apparatus of this invention is particularly useful in brake control systems such as antiskid systems and automatic braking systems, for example.

One type of commercially used brake control system includes means for generating a reference signal, such as a reference wheel velocity or a reference wheel acceleration, for example, which is representative of a reference braking condition. Generally, the brake control system also includes means for comparing the measured wheel signal with the reference signal, as well as means for modifying the braking action as necessary to bring the wheel signal into the desired relationship with the reference signal.

In a velocity based antiskid system, the reference signal may represent a desired wheel speed for an optimum level of braking effort and the modifying means may be designed to modify the braking effort as necessary to maintain the measured wheel speed substantially equal to the reference signal. Alternately, the reference signal may represent a reference wheel acceleration, and it may be compared with measured wheel acceleration to determine the appropriate level of braking effort. In the following description, these two types of brake control systems will be referred to as velocity-based systems and acceleration-based systems, respectively.

A further feature of many modern brake control systems is that the reference signal is generated either wholly or partly by measuring the rotation of a braked wheel. Often, the same wheel both provides information used to generate the reference signal and is braked by an amount controlled by the brake control system. This arrangement provides the important advantage that each braked wheel can be provided with an independent brake control system if desired. A high degree of redundancy and reliability is possible with this approach in that reference signals need not be shared by multiple wheels. Furthermore, variations in wheel or tire diameter, which may cause variations in measured wheel speed or acceleration, can be readily accommodated when a separate reference signal is maintained for each wheel.

There are, of course, difficulties in generating an accurate reference signal from measurements made on a braked wheel. Perhaps most important, a braked wheel is subject to variations in its rotational velocity as the braking effort is modified. At one extreme a braked wheel may rotate at a velocity comparable to that of an unbraked wheel; while at the other extreme, a braked wheel may be locked by the brakes. Intermediate conditions include slip velocities of zero to 100 percent of the unbraked wheel velocity. These variations in the wheel velocity as a function of braking effort complicate the generation of an accurate and reliable reference signal. An accurate reference signal may be crucial to proper brake control system operation, in that an inaccurate reference signal may result in a braking effort that is either greater or less than the optimum level.

SUMMARY OF THE INVENTION

The present invention is directed to an improved apparatus for generating a reference signal in a brake control system.

According to a first feature of the invention, means are provided for storing a reference signal and for comparing the stored reference signal with a wheel signal representative of the rotation of a braked wheel. Depending on the outcome of the comparison, the reference signal is then either increased or decreased, as appropriate.

In the past, brake control systems have often employed means for increasing a reference signal and means for simultaneously decreasing the reference signal, such that the net change in the reference signal was equal to the difference between the changes induced by the increasing and the decreasing means. One disadvantage of this prior art approach is that the net change in the reference signal is the sum of two separate effects. If, as is often the case, both effects are functions of separate variables, then the net change is itself a composite of all of these variables.

This first feature of the invention provides precise control over the reference signal by selectively enabling either means for increasing the reference signal or means for decreasing the reference signal, depending on the outcome of the comparison between the reference signal and the wheel signal. In that the reference signal is not increased and decreased simultaneously, the change in the reference signal can be precisely controlled. For example, when it is desired to decrease the reference signal, only those parameters which are relevant are utilized, and all other parameters, such as those which are relevant only where the reference signal is being increased, are completely excluded. A primary object of this first feature of the invention is to provide improved precision in controlling the magnitude of the reference signal.

According to a second feature of this invention, a brake control system includes means for storing a reference signal and means for comparing the stored reference signal with a wheel signal. The reference signal is ramped whenever the wheel signal corresponds to a more severe braking condition than does the reference signal. The rate at which the reference signal is ramped is adjusted according to the prior history of the reference signal: when the reference signal is ramped the rate is increased and when the reference signal is updated, the rate is decreased. In this context the term "ramp" denotes a change in the reference signal in the direction of increased braking effort and the term "update" denotes a change in the reference signal in the direction of reduced braking effort.

This second feature of the invention provides important advantages over certain prior art systems. For example, one system of the prior art ramps the reference signal by an amount related to wheel deceleration. This prior art approach suffers from limited dynamic range of the ramp rate, in that the acceleration of a physical object such as a wheel is limited. Furthermore, wheel acceleration may be difficult to measure accurately, and wheel acceleration may not always correspond to the desired ramp rate. For example, a locked wheel has no deceleration, yet a zero ramp rate is often suboptimal in such a situation.

In contrast, the present invention provides a ramp rate which has a large dynamic range and which adapts quickly to changing circumstances such as variations in the tire-surface coefficient of friction. The ramp rate is a function of the update/ramp history of the reference signal, and is self-correcting. Thus, if the reference signal is updated too frequently, indicating in general that the reference signal is too low, the ramp rate will be decreased to slow the rate at which the reference signal is ramped. Conversely, if the reference signal is ramped too often, indicating in general that the reference signal is too high, the rate at which the reference signal is ramped will be increased.

This second feature of the invention provides the further advantage that the system responds appropriately with a high ramp rate to a locked wheel.

A third feature of this invention is directed to a means for suppressing oscillations in a reference signal. A wheel signal often exhibits spurious oscillations which are not indicative of significant variations in the rotation of the wheel. For example, a wheel signal transducer or wheel itself may be eccentric. Alternately, a wheel may be mounted on a wheel truck subject to truck oscillations about the pitch axis. This truck pitch oscillation can cause the load and consequently the tire diameter and the wheel velocity to oscillate, thereby introducing an oscillator component into the wheel signal. Truck pitch oscillation has been observed in large aircraft such as the Boeing 747, and modern brake control systems for such aircraft are preferably designed to generate reliable reference signals in spite of wheel truck oscillation.

According to this third feature of the invention, a reference signal representative of a reference braking condition is generated from a conditioned wheel signal. This conditioned wheel signal is in turn generated from a wheel signal representative of the braking condition of a braked wheel, and is representative of a braking condition greater than that corresponding to the average wheel signal during a predetermined time interval. In a first preferred embodiment, the magnitude of the wheel signal is measured during said predetermined period of time to determine the maximum and minimum wheel signal values and then the conditioned wheel signal is set equal to the average of the maximum and minimum values less an amount proportional to the difference between the maximum and minimum values. In a second preferred embodiment, the conditioned wheel signal is set to correspond to the greatest measured braking condition during a predetermined time interval. For example, in this second embodiment, the conditioned wheel signal can be set equal to the minimum measured wheel velocity in a velocity based system (or to the maximum wheel acceleration in an acceleration based system) during the predetermined time interval.

In the past, brake control systems have on occasion used analog filters to filter out oscillations in the wheel signal in preselected frequency ranges. In many cases, these filters have filtered the wheel signal to a value substantially equal to the average wheel signal. However, such filters tend not to filter out the entire oscillatory component of the wheel signal, and to allow an amplitude dependent portion of this oscillatory component to pass through to form part of the conditioned signal. Thus, in prior art systems the conditioned signal may contain an undesired oscillatory component when the wheel signal includes a high amplitude oscillatory component.

Furthermore, one type of prior art brake control system operates to set the conditioned signal equal to the average of the oscillating wheel signal. It has been found in computer simulation that, in at least some brake control systems, improved brake control results from setting the conditioned signal to a value less than the average of the wheel signal. In one preferred embodiment, the conditioned signal is set equal to the average wheel signal reduced by an amount corresponding to three-sixteenths of the peak-to-peak variation in the wheel signal over a predetermined time interval.

By setting the conditioned signal at a value lower than the average wheel signal, the present invention responds to oscillations in the wheel signal by generating a lower reference signal, which results in more aggressive braking. This tends to counteract the tendency of many brake control systems to command excessively low levels of braking in response to oscillations in the wheel signal.

The invention itself, together with further objects and attendant advantages, will be best understood by reference to the following detailed description taken in connection with the appended drawings.

BRIEF DESCRIPTION OF THE DRAWINGS

FIG. 1 is a schematic representation of a brake control system including an antiskid control system.

FIG. 2 is a schematic representation of the functional components of the antiskid control system of FIG. 1.

DETAILED DESCRIPTION OF THE PRESENTLY PREFERRED EMBODIMENTS

Figure 3A:
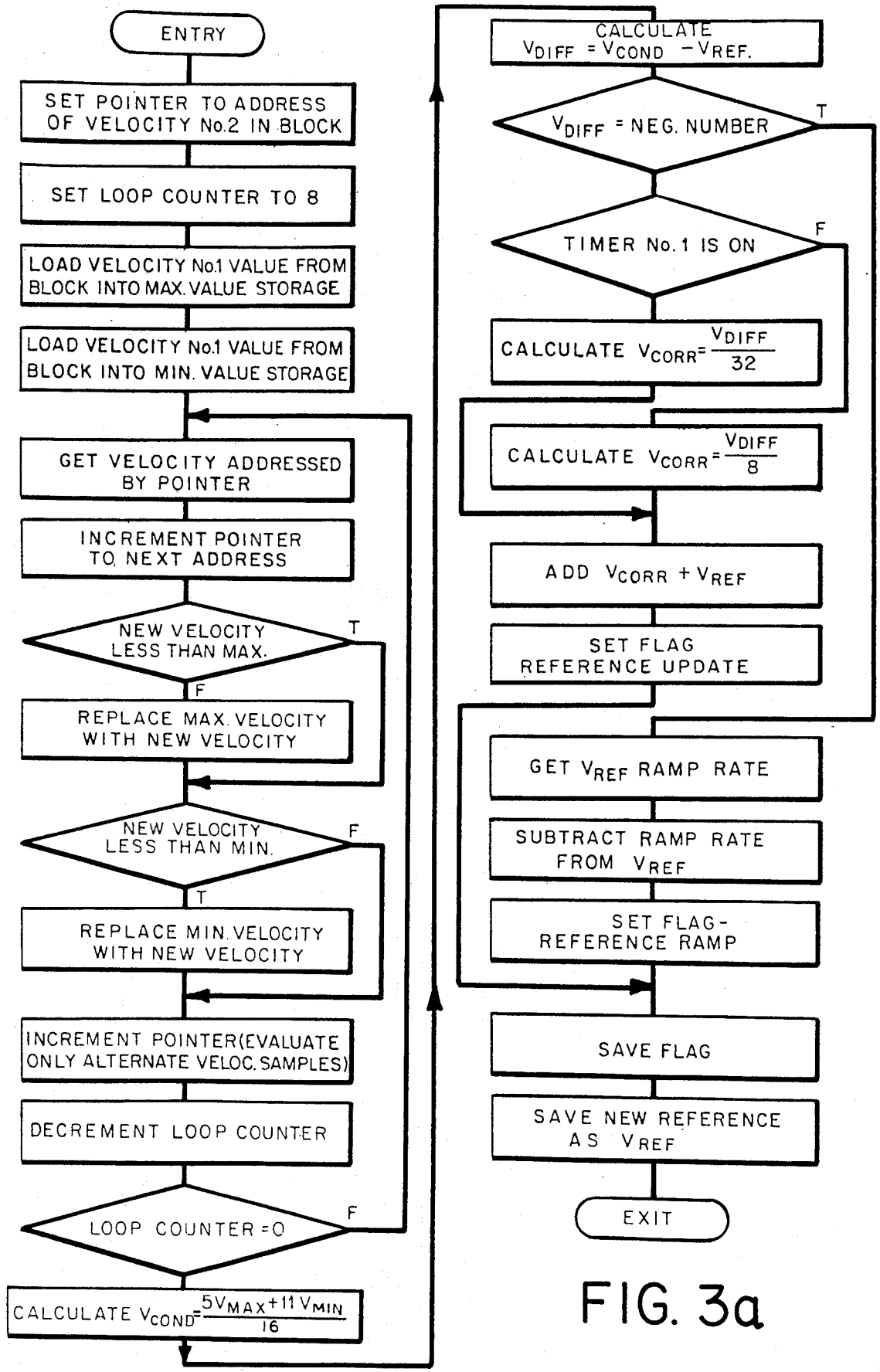
FIGS. 3a and 3b are flow charts of a first preferred embodiment of the reference velocity determination portion of the antiskid control system of FIG. 2.

Referring now to the drawings, two preferred embodiments of the apparatus for determining a reference signal of the present invention will be described in connection with FIGS. 1 and 2. FIG. 1 shows the major components of an antiskid brake control system 10 which provides brake control for the brake 20 of a rotatable wheel 30. The system 10 includes a wheel speed transducer 40 which produces a sinusoidal signal on line 41 having a frequency proportional to the angular velocity of the wheel 30. The signal on line 41 is shaped in a squaring circuit 50 and is then supplied as a wheel speed signal to an antiskid control system 60 via line 51. The antiskid control system 60 monitors the wheel signal on line 51. When the wheel signal indicates that the wheel 30 is about to go into a skid due to excessive braking force, the antiskid system 60 generates a valve driver signal on line 61. An antiskid control valve 70 is positioned in the brake line 72 which supplies brake fluid under pressure to the brake 20, and the valve 70 operates to reduce the brake pressure applied to the brake 20.

In this preferred embodiment, the brake pressure in line 72 is the metered pressure determined by the vehicle operator by means of conventional hydraulic controls. As long as the wheel 30 is not braked so severely as to go into a skid, the full metered pressure in the line 72 is passed by the valve 70 via the line 74 to the brake 20. However, if the metered brake pressure exceeds the skid threshold and drives the wheel 30 into a skid, the antiskid system 60 will generate a signal on line 61 which causes the valve 70 to reduce the pressure in the line 74 to a value less than the metered pressure. By reducing the pressure applied to the brake 30 the braking torque is reduced and the wheel 30 is prevented from skidding.

FIG. 2 shows a schematic representation of the antiskid system 60 of FIG. 1, including a wheel speed determination unit 80 which uses the wheel signal on line 51 as an input and generates an output signal representative of measured wheel speed. This wheel speed signal is supplied as an input to a reference velocity determination unit 90 for determining a reference velocity signal as an output representative of the desired wheel speed for optimum braking. This reference velocity signal is applied as an input to an apparatus 100 for determining an error velocity signal representative of the difference between the measured wheel speed signal and the reference velocity signal. The error velocity signal is applied as an input to two separate control units: the brake pressure bias modulation unit, or PBM, unit 110, and the transient control determination unit 120.

The PBM unit 110 processes the error velocity signal to arrive at a time averaged, modulated signal representative of the optimum braking presssure. This signal is modulated either to increase or to decrease the applied brake pressure as needed to prevent wheel skidding while maintaining a high, effective level of braking.

Because the PBM unit 110 uses a time average, it will on occasion be unable to respond quickly enough to prevent wheel skid. For example, when a braked wheel suddenly enters a tar strip or an ice patch or a wet surface, the skid threshold will abruptly fall and the wheel may enter a deep skid if heavily braked. Under these conditions the transient control unit 120 responds to a large error velocity signal by commanding a sharp and sudden reduction in applied brake pressure.

The wheel speed signal is also applied as an input to a lead/lag unit 130 which responds to changes in the wheel speed signal to anticipate trends and to command an early modification in brake pressure to anticipate skids.

Outputs from the PBM unit 110, the transient control unit 120 and the lead/lag unit 130 are summed in the summing device 140 to produce a composite brake control signal which is amplified by the valve driver 150 and then applied as a control signal via line 61 to the antiskid control valve.

The foregoing description of the brake control system 10 is provided to set forth the environment of the preferred embodiments of the reference signal determination apparatus of this invention. Individual components of this environment do not form a part of the present invention, and for that reason have not been described in detail here. Furthermore, those skilled in the art are familiar with various forms of these components. For example, one form of the wheel speed determination unit 80, the error velocity determination unit 100, the PBM unit 110, the transient control unit 120, and the lead/lag unit 130 is shown in U.S. Pat. No. 3,724,916, issued Apr. 3, 1973 to Edgar A. Hirzel, and entitled "Controlled Wheel Braking System". Other forms of the wheel speed determination unit 80 are described in U.S. Pat. No. 4,056,287, issued Nov. 1, 1977 to Wolfgang Gudat; and in U.S. Pat. No. 4,125,295, issued Nov. 14, 1978 to Gerhard Ruhnam, et al. An alternative form of each of the major blocks of FIG. 2 is shown in copending U.S. patent application Ser. No. 06/147,594, now U.S. Pat. No. 4,338,670, assigned to the assignee of this invention.

FIRST PREFERRED EMBODIMENT

The present invention is an improved apparatus for determining a reference signal in a brake control system. A first preferred embodiment of this invention, corresponding to the reference velocity determination unit 90 of FIG. 2, will be described in conjunction with the flow chart of FIGS. 3a and 3b.

This first preferred embodiment of the present invention is implemented as a programmed microprocessor. The microprocessor is a Z-80 CPU manufactured by Zilog, Inc., Cupertino, Calif. The program is presented in flow chart form in FIGS. 3a and 3b and is listed in assembly language form in Tables 1a, 1b, and 1c. This program operates to process inputs indicative of wheel speed to generate a signal representative of a reference velocity. The wheel speed input is provided as a set of the sixteen most recent wheel speed measurements. In this embodiment, wheel speed is determined about once every five milliseconds as a sixteen-bit digital signal. The wheel speed input is made up of the most recent sixteen-bit wheel speed signal and the fifteen previous sixteen-bit wheel speed signals, which are stored in consecutive order in a block of 32 eight-bit words of memory. Thus, the most recent wheel speed signal is stored in locations N and N+1 of memory; the previous wheel speed signal is stored in locations N+2 and N+3; and so forth. The wheel speed block of measurements forms a first-in first-out file in which the sixteen most recent wheel speed signals are stored. In the flow chart of FIG. 3, "Velocity No. 1" refers to the current wheel speed measurement, "Velocity No. 2" refers to the wheel speed measurement immediately preceding the current measurement, and so forth.

Referring now to FIG. 3a, the preferred embodiment of this invention first searches every other wheel speed measurement in the block of sixteen wheel speed measurements and sets $V_{MAX}$ equal to the greatest wheel speed measurement and $V_{MIN}$ equal to the smallest wheel speed measurement of those searched. The first iterative loop in FIG. 3a determines $V_{MAX}$ and $V_{MIN}$ in a single pass.

Next a conditioned wheel speed signal, $V_{COND}$, is generated and is set to a value no greater than the average wheel speed $\frac{1}{2}(V_{MAX}+V_{MIN})$. In this embodiment $V_{COND}$ is set equal to $\frac{1}{2}(V_{MAX}+V_{MIN})-3/16(V_{MAX}-V_{MIN})$. Thus, the amount by which $V_{COND}$ is less than the average of $V_{MAX}$ and $V_{MIN}$ is proportional to the difference between $V_{MAX}$ and $V_{MIN}$. The larger the oscillatory component of the wheel speed measurement in the selected frequency range, the more $V_{COND}$ is reduced below the average.

In this embodiment the velocity block contains sixteen measurements, each separated by about five milliseconds. Therefore, an oscillatory component having a half period less than about 70 milliseconds and greater than some upper limit will be effectively suppressed. Of course the frequency range in which oscillations are rejected may readily be modified by changing either the sampling rate or the number and choice of measurements stored in the velocity block.

After $V_{COND}$ has been determined, it is compared with $V_{REF}$, the reference velocity established during the last pass through the program, to determine which is the greater. Depending on which is the greater, $V_{REF}$ will then either be updated to a larger value, corresponding to a higher reference velocity, or be ramped to a smaller value, corresponding to a lower reference velocity.

Assuming that $V_{REF}$ is less than $V_{COND}$, $V_{REF}$ is updated by an amount proportional to $V_{DIFF}$, where $V_{DIFF}$ is equal to $V_{COND} - V_{REF}$. Assuming a constant $V_{COND}$, this causes $V_{REF}$ to asymtolically approach $V_{COND}$. A timer is used to set the proportionality constant which determines the rate at which $V_{REF}$ approaches $V_{COND}$. If the timer is on, $V_{REF}$ is updated by 1/32 of $V_{DIFF}$, while if the timer is off, $V_{REF}$ is updated by $\frac{1}{8}$ of $V_{DIFF}$. This feature has been found useful in providing rapid update of $V_{REF}$ under certain conditions, when the timer is off.

If, on the other hand, $V_{REF}$ is greater than $V_{COND}$, $V_{REF}$ will be ramped by an amount equal to two times a predetermined amount, the ramp rate. The ramp rate is a constant which is determined in the program flow-charted in FIG. 3b, and is not a function of $V_{DIFF}$, as is the correction during the update of $V_{REF}$.

After $V_{REF}$ has been updated or ramped, as appropriate, it is stored as the new $V_{REF}$, for use in conjunction with other parts of the antiskid system, such as the PBM unit, for example, in the generation of an appropriate skid control signal. In general, $V_{REF}$ is representative of the desired wheel speed signal for optimum braking. Since $V_{REF}$ is either updated or ramped in each pass through the program, the change in $V_{REF}$ is only a function of the appropriate variables. Update is a function of the difference between $V_{REF}$ and $V_{COND}$, and ramping is a function of the ramp rate. In that ramping and updating are not performed simultaneously, the change in $V_{REF}$ can be made a precise function of only the appropriate variables.

Figure 3B:
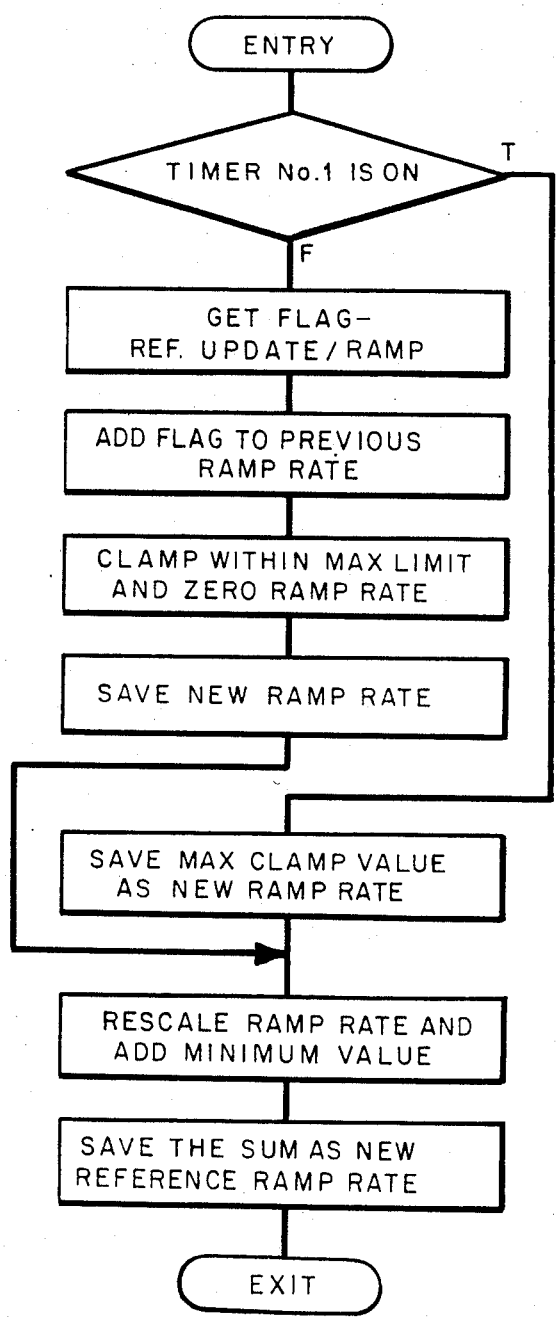

The manner in which $V_{REF}$ is changed (updated or ramped) is used as an input to the program flow-charted in FIG. 3b. This program modifies the ramp rate by an amount which varies, depending on whether $V_{REF}$ has been updated or ramped.

As shown in FIG. 3b, the ramp rate is modified by adding to it an amount which is itself a function of whether $V_{REF}$ has been updated or ramped. Thus, if $V_{REF}$ has been updated, indicated that $V_{REF}$ was less than $V_{COND}$, then the ramp rate is decreased by adding a negative number to it. In this way the rate at which $V_{REF}$ is ramped is decreased, and therefore the frequency of $V_{REF}$ updates is decreased. On the other hand, if $V_{REF}$ has been ramped, indicating that $V_{COND}$ is less than $V_{REF}$, then the ramp rate is increased by adding a positive number to it. This increases the rate at which $V_{REF}$ is ramped, and therefore increases the rate at which $V_{REF}$ approaches $V_{COND}$. This tends to increase the frequency of $V_{REF}$ updates.

Thus, the ramp rate is established as a dynamic balance which tends to seek a certain $V_{REF}$ update frequency. Too many updates cause the ramp rate to be reduced, which in turn tends to reduce the number of updates. Too few updates cause the ramp rate to be increased, which in turn tends to increase the number of updates. The sensitivity and operation of this embodiment can be altered by changing the values of the positive and negative numbers which are added to the ramp rate after ramping and updating, respectively. In this embodiment, the ramp rate is increased by about 0.0001 feet per second each time $V_{REF}$ is ramped and is decreased by about 0.0008 feet per second each time $V_{REF}$ is updated.

The program of FIG. 3b also includes means, responsive to a timer, for setting the ramp rate to a maximum value whenever the timer is on. This feature is used to provide a high ramp rate, and therefore a low $V_{REF}$, during certain periods of operation, when the timer is on. This program also includes means for clamping the ramp rate between certain maximum and minimum values and for adding a DC offset to the ramp rate to ensure that the ramp rate is always greater than a certain minimum value.

This preferred embodiment is listed in assembly language in Tables 1a, 1b, and 1c. Table 1a corresponds to the program of FIG. 3a; Table 1b corresponds to the program of FIG. 3b; and Table 1c provides a listing of the constants and variables used by the programs of Tables 1a and 1b. In order better to understand these listings, it should be understood that the wheel speed measurements stored in the velocity block as VELOC1 through VELOC7 are stored as sixteen-bit binary numbers scaled to 0.1 foot per second at the least significant bit. $V_{REF}$ corresponds to the variable REFER which is a twenty-four-bit binary number scaled to about 0.000391 foot per second at the least significant bit, and the ramp rate corresponds to RAMP and is scaled identically to REFER. Preferably the programs of Tables 1a and 1b are both executed after each wheel speed measurement is made, about once every 5 milliseconds in this embodiment.

In simulation testing, the first preferred embodiment described above has been shown to generate a reference signal which adapts quickly and appropriately to changing braking conditions such as changes in the coefficient of friction between the braked wheel and the support surface. Furthermore, this embodiment responds to oscillations in the measured wheel speed signal in a manner which both suppresses undesired oscillations and appropriately reduces the magnitude of the conditioned signal used to form the reference signal.

SECOND PREFERRED EMBODIMENT

A second preferred embodiment of the reference signal generating apparatus of this invention will be described in connection with FIG. 4 and Tables 2a and 2b. This second preferred embodiment is designed to be used in conjunction with a digital, velocity based antiskid system which generates a new measure of the rotational speed of the braked wheel once every 5 milliseconds. The program of FIG. 4 and Tables 2a, 2b is executed after every other new measure of wheel speed, or once every 10 milliseconds. This preferred embodiment utilizes a programmed Z-80 microprocessor, as does the first preferred embodiment discussed above.

Figure 4:
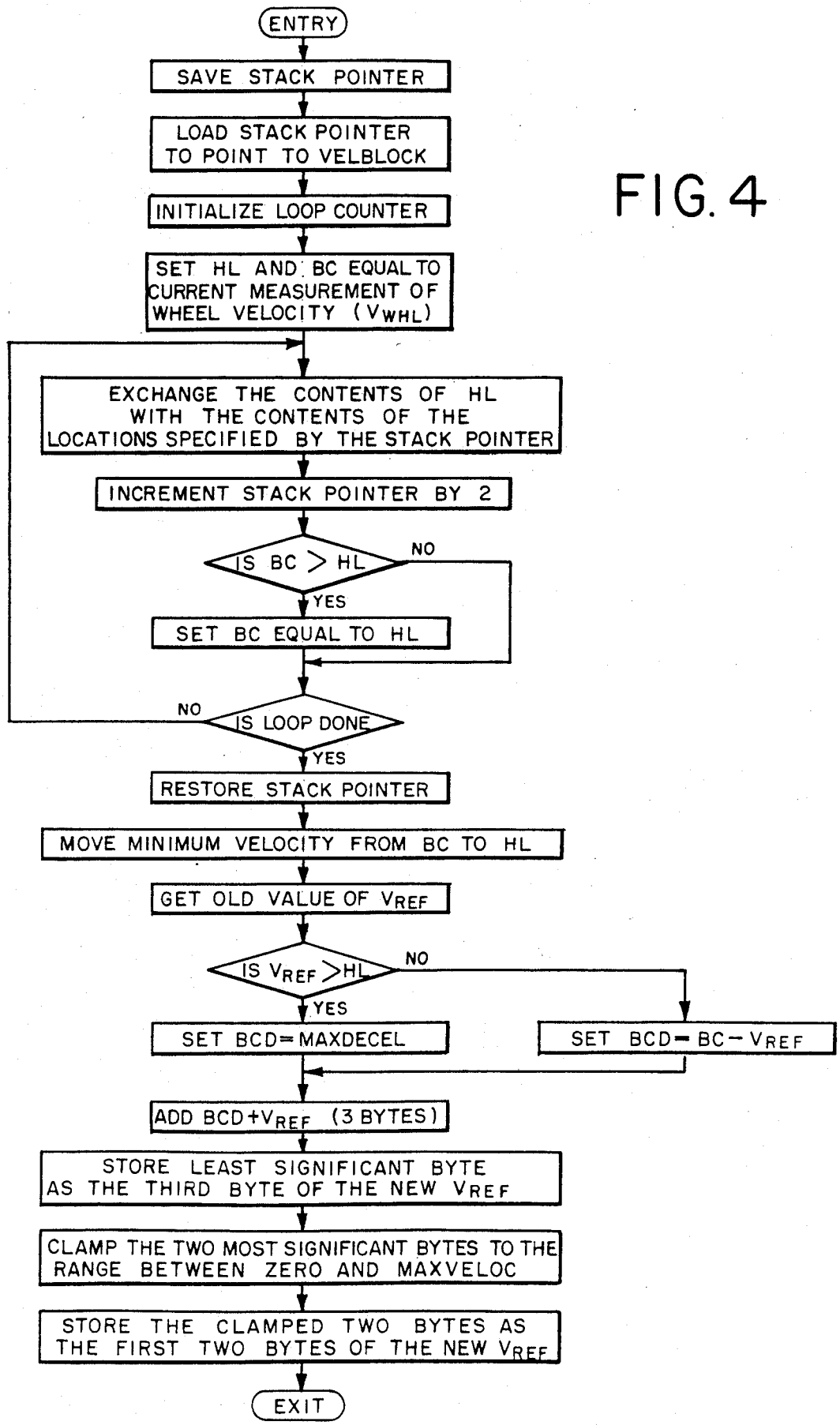
FIG. 4 is a flow chart of a second preferred embodiment of the reference velocity determination portion of the antiskid control system of FIG. 2.

FIG. 4 is a flowchart of the program listed in Table 2a. It is intended that the listing of Tables 2a, 2b be taken as the primary disclosure, and that FIG. 4 and the following detailed discussion be regarded as clarifying the listings.

Referring now to FIG. 4, this preferred embodiment takes the current value of $V_{WHL}$ (the most recent measurement of the velocity of the braked wheel) and loads this value into a block of values which will be called the velocity block. In this embodiment, the velocity block contains seven two-byte variables, which correspond to seven recent measurements of the rotational velocity of the braked wheel. As discussed above, the program of FIG. 4 is executed every 10 milliseconds, or once for every other measurement of wheel velocity. The velocity block therefore contains seven values of $V_{WHL}$: the current value and the values measured 10, 20, 30, 40, 50, and 60 milliseconds before the current value. These seven values are arranged in a FIFO file, and each value placed in the velocity block remains in the block for 70 milliseconds.

As shown in FIG. 4, the program of this embodiment operates both to revise the velocity block and to locate the minimum velocity in the block in a single pass. The register BC is used to store the minimum velocity, and the current value of $V_{WHL}$ is added to the top of the block and each entry is pushed down one place in the block in a single loop.

Once the minimum value of $V_{WHL}$ in the block has been determined, this minimum value is used as a conditioned wheel velocity in revising the value of the reference velocity. This is done by getting the two most significant bytes of the old value of the three byte reference velocity $V_{REF}$ and comparing these two bytes with the conditioned velocity, now stored in the register HL. If $V_{REF}$ is greater than the conditioned velocity, then the full three byte variable $V_{REF}$ is decreased by an amount equal to MAXDECEL. On the other hand, if $V_{REF}$ is less than the conditioned velocity, then $V_{REF}$ is set equal to the conditioned velocity.

At this point, the least significant byte of $V_{REF}$ is stored, and the two most significant bytes of $V_{REF}$ are clamped by the routine listed in Table 2b to the range between zero and MAXVELOC. The clamped bytes are then stored as the first two bytes of the new value of $V_{REF}$. This completes the revision of $V_{REF}$.

In the listng of Table 2a, $V_{WHL}$ corresponds to the variable FILTRVEL, a 16 bit variable scaled to 0.1 foot second at the least significant bit, in which positive values correspond to positive velocities and a zero value corresponds to zero velocity. $V_{WHL}$ can represent a filtered form of the actual measurement of wheel speed if desired. In addition $V_{REF}$ corresponds to the variable VELREF, a 24 bit variable scaled to 0.000391 ft/second at the least significant bit, in which positive values correspond to positive velocities and a zero value corresponds to zero velocity. Thus, the two high order bytes of VELREF are scaled identically to the two bytes of FILTRVEL. The variables A, B, C, D, H, L, and SP of Table 2a refer to standard registers of the Z-80 microprocessor. The variable VELBLOCK contains the address of the start of the velocity block and BLOKSIZE specifies the number of values of $V_{WHL}$ stored in the velocity block.

The variable MAXDECEL of Table 2a is selected to exceed somewhat the maximum physically expected deceleration of the vehicle. MAXDECEL is scaled like VELREF, and therefore 200 (HEX) corresponds to a value of 0.2 feet/second. Since the program of Table 2a is executed 100 times per second, this value of MAXDECEL corresponds to a deceleration of 20 ft/sec/sec for VELREF. Thus, this embodiment operates to decrease the reference velocity VELREF at the rate of 20 ft/sec/sec whenever the reference velocity is greater than the measured wheel velocity.

The program of FIG. 4 and Table 2a operates to set the conditioned wheel signal equal to the minimum value stored in the velocity block. Every second value of the measured wheel speed is stored in the velocity block, and therefore the conditioned wheel signal is substantially equal to the minimum value of the measured wheel speed in the last 60 milliseconds. This means that the velocity block will contain a value substantially equal to the actual minimum wheel speed for all oscillations with a period less than about 0.08 seconds (frequency greater than about 12 Hz.), and that all such oscillations will therefore be suppressed. By varying the size of the velocity block, the frequency suppression characteristics of the velocity block can readily be varied to suit individual applications.

From the foregoing, it should be apparent that this embodiment operates in such a way that noise or periodic inaccuracies in the wheel signal (such as errors attributable to landing gear oscillation or wheel truck oscillation) will not cause the reference velocity to be set at an erroneously high value. Such noise will be ignored if it causes some values of $V_{WHL}$ to be erroneously high, because the minimum value of $V_{WHL}$ in the velocity block is selected as the conditioned velocity signal. On the other hand, if the noise causes some values of $V_{WHL}$ to be erroneously low, this system tends to keep $V_{REF}$ at an even lower value than usual. Thus, noise of the type described above tends to bias the reference signal in the direction of more aggressive rather than less aggressive braking. In a velocity based system, the reference signal is biased towards lower velocities, and in an acceleration based system the reference signal is biased towards accelerations of higher magnitudes.

Because noise does not result in an excessively high conditioned signal, the reference velocity can be updated to equal the conditioned signal when the reference velocity is lower than the conditioned signal without concern that noise may result in an excessively high value for the reference velocity.

Throughout this specification and the following claims, the term "signal representative of a braking condition" is intended to encompass both velocity and acceleration-based signals, the term "maximum braking condition" is intended to encompass both minimum velocity (in a velocity based system) and maximum negative acceleration (in an acceleration based system).

It is not necessary that the conditioned wheel signal be set equal to the minimum value of the wheel signal in the velocity block in all embodiments of this invention. For example, the average of the two, three or more lowest values of the wheel signals in the velocity block can be used, or the average of the minimum value and the average of all values in the velocity block can be used. In all of these cases, important advantages in terms of increased immunity to excessively high reference velocities due to noise are obtained.

Of course, it should be understood that various changes and modifications to the preferred embodiments described herein will be apparent to those skilled in the art. For example, the invention is not limited to digital embodiments or to velocity based systems. On the contrary, it may be embodied in analog systems, and it may be used to generate an acceleration reference in acceleration based brake control systems. It is therefore intended that the foregoing detailed description be regarded as illustrative rather than limiting, and that it be understood that it is the following claims, including all equivalents, which define the scope of this invention.

TABLE 1a

REFERENCE VELOCITY DETERMINATION

TABLE 1a-continued

```
;
REFX   LD HL,VELOC2
       LD B,7 ; LOOP COUNT
       EXX
       LD DE,(VELOC1)
       LD B,D
       LD C,E
       EXX
;
REFA   LD A,(HL) ; SET LOW BYTE
       EX AF,AF
       INC HL
       LD A,(HL) ; SET HIGH BYTE
       INC HL
       EXX
       LD H,A
       EX AF,AF
       LD L,A ; MOVE VELOCITY TO HL
       CP A
       SBC HL,DE ; COMPARE WITH MAX
       JR NC,REFB
       ADD HL,DE ; RECOVER NEW VELOCITY
       JR REFC
REFB   ADD HL,DE ; RECOVER NEW VELOCITY
       LD D,H
       LD E,L
REFC   CP A
       SBC HL,BC ; COMPARE WITH MIN VELOCITY
       JR NC,REFD
       LD C,A
       EX AF,AF
       LD B,A ; SAVE NEW AS MIN
REFD   EXX
       INC HL ; SKIP EVERY OTHER VELOCITY IN
       BLOCK
       INC HL
       DJNZ REFA ; LOOP FOR WHOLE VELOCITY
       BLOCK
;
       EXX
       LD H,D
       LD L,E ; MOVE MAX VELOCITY
       XOR A
       SBC HL,BC ; GET DIFFERENCE
       EX DE,HL
       ADD HL,BC
       SRL D
       RR E ; DIVIDE BY 2
       XOR A
       SBC HL,DE
       SRL D
       RR E
       ADD HL,DE
       SRL D
       RR E
       XOR A
       SBC HL,DE
       SRL H
       RR L
       LD DE,(REFER+1)
       XOR A
       SBC HL,DE
       JR C,REFE
;
;      REFERENCE UPDATE
;
       LD C,L
       LD L,H
       LD H,O
       LD A,(FORTIM); GET TIMER VALUE
       CP O
       JR NZ,REFK
       JR REFF; FINE TUNE ADDRESS DURING
       TESTING
       SLA C
       ADC HL,HL
       SLA C
       ADC HL,HL
```

TABLE 1a-continued

```
REFF   SLA C
       ADC HL,HL
       SLA C
       ADC HL,HL
REFK   SLA C
       ADC HL,HL
       SLA C
       ADC HL,HL
       SLA C
       ADC HL,HL
       LD A,(REFER)
       ADD A,C
       ADC HL,DE
       LD (REFER+1),HL; UPDATE REFERENCE
       LD (REFER),A
       LD DE,RTDOWN
       JR REFG
;
;      REFERENCE RAMP
;
REFE   EX DE,HL ; MOVE REFERENCE TO HL
       LD A,(RAMP)
       LD C,A
       LD A,(REFER); GET SCALER
       LD DE,O
       SUB C
       SBC HL,DE; SUBTRACT CARRY IF ANY
       JR C,REFH
       SUB C
       SBC HL,DE
       JR NC,REFI
REFH   LD HL,O
REFI   LD (REFER),A; SAVE NEW SCALER
       LD (REFER+1),HL; SAVE NEW REFERENCE
       LD DE,RTUP
;
REFG   LD (SCORE),DE
;
       LD DE,MAXREF; REFERENCE LIMIT (ANY
;      SPEED ABOVE THIS CONSTITUTES A FAILURE)
       EX DE,HL
       XOR A
       SBC HL,DE
       JR NC,REFJ; JUMP, REFERENCE WITHIN
       RANGE
       LD DE,MAXREF; OTHERWISE CLAMP
       REFERENCE
       LD (REFER+1),DE
REFJ   RET; RETURN
```

TABLE 1b

```
;      REFERENCE RAMP RATE DETERMINATION
;      *********************************************
;
AVDECX LD A,(FORTIM)
       CP O
       JR NZ,AVDECC
       LD DE,(SCORE)
       LD HL,(DECEL)
       ADD HL,DE
       LD (DECEL),HL
       EX DE,HL
       BIT 7,D
       JR Z,AVDECB
       LD DE,O
       JR AVDECA
AVDECB LD HL,MAXDEC*256
       XOR A
       SBC HL,DE
       JR NC,AVDECA
AVDECC LD DE,MAXDEC*256
AVDECA LD (DECEL),DE
       LD A,D
       ADD A,MINDEC
       LD (RAMP),A
       RET; RETURN
```

TABLE 1c

```
;          *  *****  *
;          *         *
;          *  RAM    *
;          *         *
;          *  *****  *
;
DECEL    EQU 80EH; REF RAMP RATE (TWO BYTES)
ERROR    EQU 815H; ERROR VALUE FOR CONTROL (TWO BYTES)
FORTIM   EQU 811H; TIMER FOR SLOW REFER. UPDATE
RAMP     EQU 810H; TIME CONSTANT FOR REFERENCE RATE
REFER    EQU 807H; REFERENCE (THREE BYTES)
SCORE    EQU 81BH; TEMP STORAGE FOR REFER RATE GENERATION
VELOC1   EQU 820H; NEW VELOCITY
VELOC2   EQU 822H; PREVIOUS VELOCITY (ONE LOOP TIME BACK)
VELOC3   EQU 824H; PREVIOUS VELOCITY (TWO LOOP TIMES BACK)
VELOC4   EQU 826H; PREVIOUS VELOCITY (THREE LOOP TIMES BACK)
VELOC5   EQU 828H; PREVIOUS VELOCITY (FOUR LOOP TIMES BACK)
VELOC6   EQU 82AH; PREVIOUS VELOCITY (FIVE LOOP TIMES BACK)
VELOC7   EQU 82CH; PREVIOUS VELOCITY (SIX LOOP TIMES BACK)
VELOC8   EQU 82EH; PREVIOUS VELOCITY (SEVEN LOOP TIMES BACK)
VELOC9   EQU 830H; PREVIOUS VELOCITY (EIGHT LOOP TIMES BACK)
VELOC10  EQU 832H; PREVIOUS VELOCITY (NINE LOOP TIMES BACK)
VELOC11  EQU 834H; PREVIOUS VELOCITY (TEN LOOP TIMES BACK)
VELOC12  EQU 836H; PREVIOUS VELOCITY (ELEVEN LOOP TIMES BACK)
VELOC13  EQU 838H; PREVIOUS VELOCITY (TWELVE LOOP TIMES BACK)
VELOC14  EQU 83AH; PREVIOUS VELOCITY (THIRTEEN LOOP TIMES BACK)
VELOC15  EQU 83CH; PREVIOUS VELOCITY (FOURTEEN LOOP TIMES BACK)
VELOC16  EQU 83EH; PREVIOUS VELOCITY (FIFTEEN LOOP TIMES BACK)
;
;        *  ***************************  *
;        *                               *
;        *       GENERAL CONSTANTS       *
;        *                               *
;        *  ***************************  *
;
MAXREF   EQU 0DACH; CLAMP FOR MAX REFERENCE VALUE (350 FT/SEC)
MINDEC   EQU 24; MINIMUM DECEL
MAXDEC   EQU 70H; MAXIMUM DECEL
RTUP     EQU 40H
RTDOWN   EQU -200H
```

TABLE 2a
REFERENCE VELOCITY DETERMINATION

| | |
|---|---|
| REFERX | LD (TEMPSTAK),SP |
| | LD SP,VELBLOCK |
| | LD A,BLOKSIZE |
| | LD HL,(FILTRVEL) |
| | LD B,H |
| | LD C,L |
| REFERA | EX (SP),HL |
| | INC SP |
| | INC SP |
| | OR A |
| | SBC HL,BC |
| | ADD HL,BC |
| | JR NC,REFERB |
| | LD C,L |
| | LD B,H |
| REFERB | DEC A |
| | JR NZ,REFERA |
| | LD SP,(TEMPSTAK) |
| | LD H,B |
| | LD L,C |
| | LD DE,(VELREF+1) |
| | XOR A |
| | SBC HL,DE |
| | LD B,H |
| | LD C,L |
| | LD D,0 |
| | JR NC,REFERC |
| | LD B,0FFH |
| | LD C,HI (MAXDECEL) |
| | LD D,LO (MAXDECEL) |
| REFERC | LD HL,(VELREF+1) |
| | LD A,(VELREF) |
| | ADD A,D |
| | ADC HL,BC |
| | LD (VELREF),A |

TABLE 2a-continued
REFERENCE VELOCITY DETERMINATION

| | |
|---|---|
| | LD DE,MAXVELOC |
| | CALL CLAMPX |
| | LD (VELREF+1),HL |
| REFERZ | RET |
| ; | |
| MAXDECEL | EQU -200H |
| BLOKSIZE | EQU 7 |
| MAXVELOC | EQU 4219 |

TABLE 2b
CLAMP ROUTINE

| | |
|---|---|
| CLAMPX | BIT 7,H |
| | JR Z,CLAMP1 |
| | LD HL,0 |
| | JR CLAMPZ |
| CLAMP1 | CP A |
| | SBC HL,DE |
| | ADD HL,DE |
| | JR C,CLAMPZ |
| | EX DE,HL |
| CLAMPZ | RET |

I claim:

1. An apparatus for generating a reference signal representative of a reference braking condition in a brake control system for a braked wheel, said brake control system including means for generating a wheel signal having a plurality of values which vary in time and are each representative of a respective measurement of a braking condition of the braked wheel at a separate respective time period, said apparatus comprising:
   means for determining the value of the wheel signal corresponding to a maximum braking condition from a plurality of values of the wheel signal occurring during a first time interval;
   means for generating a conditioned wheel signal indicative of the value corresponding to the maximum braking condition; and
   means for generating a reference signal representative of a reference braking condition as a function of the conditioned wheel signal.

2. The apparatus of claim 1 wherein the determining means comprises:
   means for storing the plurality of values of the wheel signal during the first time interval;
   means for comparing the stored values with one another to determine stored value having an extreme magnitude in a predetermined direction; and
   means for supplying the stored value having the extreme magnitude to the generating means as the value corresponding to the maximum braking condition.

3. The apparatus of claim 1 or 2 wherein the reference signal generating means comprises:
   means for setting a next value of the reference signal to a value corresponding to the conditioned wheel signal when the conditioned wheel signal is indicative of a lesser braking condition than is a current value of the reference signal.

4. The apparatus of claim 1 or 2 wherein the conditioned wheel signal is indicative of a conditioned wheel velocity, wherein the reference signal is indicative of a reference velocity, and wherein the reference signal generating means comprises:
   means for setting a next value of the reference signal to a value corresponding to the conditioned wheel signal when the conditioned wheel signal is indicative of a greater velocity than is a current value of the reference signal.

5. The apparatus of claim 1 wherein the plurality of values comprises at least seven values.

6. The apparatus of claim 1 or 5 wherein the first time interval comprises at least 0.07 seconds.

7. The apparatus of claim 1 or 5 wherein the first time interval is greater than 1/20 of a second and less than 1/10 of a second.

8. An apparatus for generating a reference signal representative of a reference velocity in a brake control system for a braked wheel, said brake control system including means for generating a velocity signal having a plurality of values which vary in time and are each representative of a respective measurement of the rotation velocity of said braked wheel at a separate respective time period, said apparatus comprising:
   means for determining the minimum value of the velocity signal from a plurality of values of the velocity signal occurring during a first time interval;
   means for generating a conditioned velocity signal indicative of the minimum value; and
   means for generating a reference signal representative of a reference velocity as a function of the conditioned velocity signal.

9. The apparatus of claim 8 wherein the determining means comprises:
   means for storing the plurality of values of the velocity signal during the first time interval;
   means for comparing the stored values with each other to determine the minimum stored value; and
   means for supplying the minimum stored value to the generating means as the minimum value.

10. The apparatus of claim 8 wherein the reference signal generating means comprises:
    means for setting a next value of the reference signal to a value corresponding to the conditioned velocity signal when the conditioned velocity signal is indicative of a greater velocity than is a current value of the reference signal.

11. The apparatus of claim 8 wherein the plurality of values comprises at least seven values.

12. The apparatus of claim 8 or 11 wherein the first time interval comprises at least 0.07 seconds.

13. The apparatus of claim 8 or 11 wherein the first time interval is greater than 0.05 seconds as less than 0.1 second.

14. In a brake control system for a braked wheel, comprising means for generating a wheel signal having a plurality of values which vary in time and are each indicative of a respective measurement of the rotational behavior of said braked wheel at a respective time, means for generating a brake control signal as a function of the wheel signal and a reference signal representative of a reference braking condition, and means for modifying a braking action applied to the braked wheel in response to the brake control signal, the improvement comprising:
   means for determining the value of the wheel signal having an extreme magnitude in a predetermined direction occurring during a first time interval;
   means for generating a conditioned wheel signal indicative of the extreme magnitude; and
   means for generating the reference signal representative of the reference braking condition as a function of the conditioned wheel signal.

15. The improvement of claim 14 wherein the reference signal generating means operates to generate the reference signal at a value no greater than that corresponding to the conditioned wheel signal.

16. The improvement of claim 14 wherein the reference signal generating means comprises:
    means for setting a next value of the reference signal to a value corresponding to the conditioned wheel when the conditioned wheel signal is indicative of a lesser braking condition than is a current value of the reference signal.

17. The improvement of claim 14 or 15 wherein the wheel signal is indicative of wheel velocity and the reference signal is indicative of a reference velocity.

18. The improvement of claim 14 or 15 wherein the first time interval is in the range of 1/20 of a second to 1/10 of a second.

19. The improvement of claim 18 wherein the first time interval is 0.07 seconds.

20. In a brake control system for a braked wheel, comprising means for generating a digital wheel signal on a periodic basis, each value of the wheel signal indicative of a measured value of the rotational velocity of said braked wheel at a respective time, means for generating a brake control signal as a function of the wheel signal and a reference signal representative of a reference velocity, and means for modifying a braking action applied to the braked wheel in response to the brake control signal, the improvement comprising:
   a computer;

means, included in the computer, for storing a plurality of values of the wheel signal occurring during a first time period; p1 means, included in the computer, for determining the minimum one of the stored values of the wheel signal;

means, included in the computer, for generating a conditioned wheel signal corresponding to the minimum one of the stored values; and means, included in the computer and responsive to the conditioned wheel signal, for generating the reference signal as a function of the conditioned wheel signal.

21. The improvement of claim 20 wherein the reference signal generating means comprises:

means for setting a next value the reference signal to a value corresponding to the conditioned wheel signal when the conditioned wheel signal is indicative of a greater velocity than is a current value of the reference signal.

22. The improvement of claim 20 or 21 wherein the storing means acts to store only every other value of the wheel signal occurring during the first time period.

23. The improvement of claim 20 or 21 wherein the storing means stores greater than 5 values of the wheel signal.

24. The improvement of claim 20 or 21 wherein the duration of the first time period is in the range between 1/20 of a second and 1/10 of a second.

25. The improvement of claim 20 or 21 wherein the duration of the first time interval is 0.07 second.

26. In a brake control system for a braked wheel, comprising means for generating a digital wheel signal on a periodic basis, each value of which is indicative of a measured value of the rotational behavior of said braked wheel at a respective time, means for generating a brake control signal as a function of the wheel signal and a reference signal representative of a reference braking condition, and means for modifying a braking action applied to the braked wheel in response to the brake control signal, the improvement comprising:

a computer;

means, included in the computer, for maintaining a wheel signal block which includes a plurality of stored values, each of which is indicative of a selected respective one of the plurality of values of the wheel signal occurring in a selected time period, which plurality of values includes the most recently generated value of the wheel signal;

means, included in the computer, for searching the when signal block to select the stored value associated with value of the wheel signal indicative of the greatest braking condition;

means, included in the computer, for generating a conditioned wheel signal as a function of the selected stored value; and means, included in the computer, for generating the reference signal as a function of the conditioned signal.

27. In a brake control system for a braked wheel, comprising means for generating a digital wheel signal on a periodic basis, each value of the wheel signal being indicative of a measured value of the rotational velocity of said braked wheel at a respective time, means for generating a brake control signal as a function of the wheel signal and a reference signal representative of a reference velocity, and means for modifying a braking action applied to the braked wheel in response to the brake control signal, the improvement comprising:

a computer;

means, included in the computer, for maintaining a wheel signal block which includes a plurality of stored values, each of which is indicative of a selected respective one of the plurality of values of the wheel signal occurring in a selected time period, which plurality of values includes the most recently generated value of the wheel signal;

means, included in the computer, for searching the wheel signal block to select the stored value associated with value of the wheel signal indicative of the minimum velocity;

means, included in the computer, for generating a conditioned wheel signal which corresponds to the selected stored value; and means, included in the computer, for generating the reference signal as a function of the conditioned wheel signal.

28. The improvement of claim 26 or 27 wherein the maintaining means acts to store only every other value of the wheel signal occurring during the selected time period in the wheel signal block.

29. The improvement of claim 26 or 27 wherein the maintaining means stores greater than 5 values of the wheel signal in the wheel signal block.

30. The improvement of claim 26 or 27 wherein the duration of the selected time period is in the range between 1/20 of a second and 1/10 of a second.

31. The improvement of claim 26 or 27 wherein the duration of the selected time period is substantially equal to 0.07 second.

* * * * *